Patented Nov. 7, 1950

2,528,928

UNITED STATES PATENT OFFICE 2,528,928

SUBSTITUTED NITRO MALONIC ESTERS

David I. Weisblat and Douglas A. Lyttle, Kalamazoo, Mich., assignors to The Upjohn Company, Kalamazoo, Mich., a corporation of Michigan No Drawing. Application October 2, 1947, Serial No. 777,584

20 Claims. (Cl. 260—319)

The present invention relates to the preparation of amino acids and is more particularly concerned with a novel method for the synthesis of alpha amino acids.

It is known that alpha amino acids are fundamental in the field of nutrition and physiological chemistry, and it is presently believed that they are the simple units from which proteins are formed. Investigators have isolated over twenty alpha amino acids from products resulting from the treatment of protein material of all kinds. These alpha amino acids may be empirically divided into two groups on a basis of physiological demand. In this way some amino acids may be classified as dispensable, or not absolutely necessary for the preservation and maintenance of animal life, while others may be classified as indispensable, or absolutely essential for animal life. The amino acids arginine, lysine, histidine, valine, leucine, isoleucine, phenylalanine, threonine, methionine and tryptophane are considered indispensable in the nutrition of some species of animals, while other amino acids which have been isolated from protein, although of nutritional significance, are not presently considered indispensable in the animal diet.

Such non-essential amino acids include glutamic acid, serine, aspartic acid, alanine, norleucine, glycine, hydroxyglutamic acid and cysteine. Still other alpha amino acids are known which are not derived from natural sources and, while important as chemicals and chemical intermediates, such have not received as much attention as the nutritionally significant amino acids.

The significance of the alpha amino acids in human and animal nutrition makes their synthesis generally of great importance. The voluminous literature and the great number of attempts to find suitable procedures for the preparation of alpha primary amino acids is indicative of this importance. (Gilman, Organic Chemistry vol. II, "Natural Amino Acids," by H. T. Clark, pp. 1079–1166, John Wiley and Sons, New York, 1943; Schmidt, "The Chemistry of Amino Acids and Proteins," chapter II, "The Constitution and Synthesis of Amino Acids" by Max S. Dunn, Charles C. Thomas, Baltimore, 1938; Vickery and Schmidt, Chem. Rev. 9, 169–318, 1931.) The principal methods which previously have been employed for the preparation of amino acids involve: 1. The cyanohydrin synthesis (Strecker synthesis). 2. The action of ammonia on alpha halogen acids. 3. Reactions using malonic esters (a) to give alpha halogen acids for method (2), (b) reaction of phthalamidomalonic ester with halogen compounds, (c) reactions of amino malonic esters, (d) reaction of potassium ethylmalonates with hydrazine. 4. Condensation of aldehydes with (a) hydantoin, (b) diketopiperazine, (c) hippuric acid (azlactone method). 5. From alpha keto acids by (a) reduction and amination, (b) reduction of oximes, (c) reduction of hydrazones.

Detailed procedures for the production of alpha amino acids usually involve, in some stage of the synthesis, one of these general methods. The preparation of tryptophane from gramine (Albertson et al, J. Am. Chem. Soc. 66, 500 (1944), 67, 36–7 (1945); Snyder et al, J. Am. Chem. Soc. 66, 350 (1944); Howe et al, J. Am. Chem. Soc. 67, 38 (1945)) may be considered as a variant of method 3 (b). The preparation of methionine (Windus and Marvel, J. Am. Chem. Soc. 52, 275 (1930); Barger and Weichselbaum in Blatt Org. Synthesis, col. vol. II., 384, John Wiley and Sons, New York, 1943) proceeds through a malonic ester or phthalimidomalonic ester by procedures 3 and 3 (b). Ornithine, necessary for the preparation of arginine, has been prepared by method 3 (b) (Fischer, Ber. 34, 454 (1901)), as the dipicrate from $CH_2=CH-CH=CH-COOH$ (beta vinylacrylic acid) and ammonia (Fischer and Raske, Ber. 38, 3607 (1905)), and as the dibenzoyl derivative, by Kumatsu and Sugasawa, following an eleven step procedure from acrolein (J. Pharm. Soc., Japan, 48, 24 (1929), Chem. Abstr. 28, 1758 (1928)). Because of the difficulty of synthesis, the preferred method of obtaining this amino acid is by the hydrolysis of gelatin (Blatt Organic Syntheses, col. vol. II, 59–62, John Wiley and Sons, New York, 1943). Histidine has been prepared by procedures 2, 3 (a) and 4 (c). Valine (Organic Syntheses 20, 106 (1940)), leucine, and isoleucine are best prepared by methods 1 and 3 (a). Phenylalanine has been prepared by methods 3 (b), 4 (b) and 4 (c). (Blatt Org. Syn., col. vol. II, 489–94, John Wiley and Sons, New York, 1943). Threonine has been prepared by a procedure under method 2 (Org. Syn. 20, 101, John Wiley and Sons, New York, 1940), the necessary halogen acid being obtained from crotonic acid.

Other amino acids which are not considered as essential to certain animal diets have been prepared by variations of these methods. They are aspartic acid, glutamic acid, hydroxyglutamic acid, glycine, alanine, norleucine, serine, cysteine and tyrosine.

Inasmuch as the amino acids appear to play an increasingly important role in the nutrition and physiology of the human race, the importance thereof, as well as the importance of a new and more practicable synthesis therefor, is considered obvious.

It is an object of the present invention to provide a new method for the synthesis of amino acids. An additional object of the invention is the provision of a method for the synthesis of amino acids in a manner which may be conducted with increased facility in comparison with known methods. A further object of the invention is the provision of a novel method for the synthesis of amino acids which will be more economically and commercially practicable. Another object of the invention is the provision of a novel method for the production of amino acids which involves the "alkylation" of an ester of nitromalonic acid. A further object of the invention is the provision of a process for the preparation of amino acids which includes the step of decarbalkoxylating a substituted nitromalonic ester and reducing an alpha nitro acid or an ester thereof. Another object of the invention is the provision of a method for the synthesis of amino acids which proceeds through nitro acid esters corresponding to the desired amino acid. A further object of the invention is the provision of a novel method for the synthesis of amino acids which may be conducted in four steps from the starting nitromalonate, or with various combinations of steps when starting with an intermediate. Another object of the invention is the provision of a method for the preparation of amino acids which proceeds through the steps of alkylation, decarbalkoxylation, reduction, hydrolysis and, if desired, resolution. Another object of the invention is the provision of a process which involves the alkylation of an ester of nitromalonic acid, decarbalkoxylation, reduction and hydrolysis of the resulting nitro acid ester to the amino acid. A still further object of the invention is the provision of novel compounds, intermediates in the preparation of amino acids, including esters of substituted nitromalonic acids, esters of substituted nitroacetic acids, and, in some cases, esters of the amino acids. Other objects of the invention will be apparent from the following specification and claims.

The method of our invention is generally applicable to the preparation of the above-named and other primary alpha amino acids. The method of our invention essentially involves the treatment of an ester of nitromalonic acid, e. g., ethyl nitromalonate, with a selected "alkylating agent," i. e., an agent of the alkylating type which is capable of introducing a desired group into the acid portion of the nitromalonate molecule at the alpha carbon atom, decarbalkoxylation of the substituted nitromalonate, reduction of the substituted nitroacetic ester thus formed, and hydrolysis of the amino ester to the particular amino acid concerned.

The novel process of our invention has the advantage of being much more direct than methods heretofore proposed for the preparation of amino acids, and has surprisingly failed of recognition by leading investigators as constituting a valuable method for the preparation of alpha amino acids throughout the many years in which extensive experimentation has been conducted in an effort to find a practical method of synthesis.

The alkylation step of our new synthesis may be carried out by reacting together a desired ester of nitromalonic acid, or salts thereof, and a selected "alkylating agent." By "alkylating agent," as herein employed, is intended an agent comprising at least a selected group, and capable of introducing said group into the acid portion of the nitromalonate molecule at the alpha carbon atom. As agents in this capacity may be mentioned:

1 A. Alkyl halides, alkyl arylsulfonates, and alkyl sulfates with a basic catalysis;
  B. Carbinols with boron trifluoride catalysis;
  C. Substituted dialkylamines (tertiary amines), or quaternary ammonium compounds with or without alkali and/or heat;
2   Aldehydes or ketones with acidic, basic, or neutral catalysis according to Knoevnagel type of condensation.
3 A. Compounds containing activated double bonds;
  B. Compounds containing epoxide or thio-epoxide systems.

It will be noted that the esters of nitromalonic acid have a negative substituent on the carbon atom alpha to the esterified carboxyl groups. Thus the alkylation of the nitromalonic acid esters may be carried out in a manner somewhat similar to the alkylation of malonic or cyanacetic esters and likewise somewhat similar to the alkylations of nitroparaffins, for example, with the employment of such types of compounds as mentioned in the foregoing paragraph. Any suitable agent may be employed for the alkylation of the nitromalonates, provided, of course, that the desired substituted nitromalonate be produced by the alkylation reaction, but the above-mentioned types of compounds have been found especially satisfactory, and their employment in the alkylation step therefore constitutes a preferred embodiment of the invention.

The alkylation step of the new synthesis may, for example, be carried out by reacting together an ester of nitromalonic acid, e. g., ethyl nitromalonate, and a suitable alkylating agent, for example, one such as is utilized in the preparation of tryptophane, gramine (3-dimethylaminomethylindole), with or without the employment of alkali and heat. We have found that when the process is conducted in this manner, e. g., with the employment of a nitromalonate and a substituted dialkylamine such as gramine, it is usually advantageously, although not necessarily, carried out in an anhydrous organic solvent such as xylene, while passing a slow stream of nitrogen through the reaction with vigorous agitation, at a temperature usually up to about 115 degrees centigrade over a period of five hours, more or less. During this period of heating, a considerable quantity of dialkylamine (dimethylamine from gramine), is evolved. The hot solution may then be filtered from a small amount of crystalline solid which usually forms and the xylene removed by concentration in vacuo. The residual gum may be dissolved in chloroform, the solution extracted with dilute hydrochloric acid and washed with water until neutral. The remaining solution may be dried, concentrated in a vacuum, freed of excess nitromalonate by distillation under reduced pressure, dissolved in chloroform or similar solvent, and extracted to exhaustion with dilute alkali. After acidification and extraction with chloroform or similar solvent, drying and concentrating the last chloroform extract usually leaves an oil of analytical purity. This oil is an ester of the desired substituted nitromalonic acid, in the case of the foregoing example wherein gramine and ethyl nitromalonate were reacted, of alpha-nitro-alphacarbethoxy-beta-(3-indole)-propionic acid, in a substantially pure form. Other methods may be employed to separate the ester and will be apparent to one skilled in the art.

The above alkylation of a nitromalonic acid ester with a substituted dialkylamine is exemplary of the type of alkylation hereinafter described as Type 1. The type of alkylation hereinafter described as Type 2 is effected by the use of an aldehyde or ketone with an acidic, basic, or neutral catalysis, and is usually, although not necessarily, conducted at a relatively low temperature, e. g., below about 20 degrees centigrade, in the presence of a catalyst such as piperidine or para-toluenesulfonic acid. A hydroxy-containing substituted nitromalonic ester is the first product of the reaction, and if it is not desired to produce an amino acid containing a hydroxyl group on the beta carbon atom, such may usually be expelled from the molecule by gentle heating. Type 2 condensations are generally carried out according to known considerations for a Knoevnagel type of reaction. Type 3 alkylations, in which the alkylating agent contains either an activated double bond, an epoxide system, or a thioepoxide system, is usually carried out in the presence of a metal alkoxide, such as sodium ethoxide, or other similar catalyst.

It should be understood that the procedure outlined above for the alkylation of an ester of nitromalonic acid to produce the corresponding substituted nitromalonate may be varied widely as to procedure and alkylating agent, many closely related modes of operation being entirely satisfactory and the exact method of alkylation being of concern only in that a selected ester of nitromalonic acid be combined with an alkylating agent to yield the selected ester of the desired substituted nitromalonic acid.

The nitromalonate or nitromalonate salt employed in the process may also be varied widely, and representative esters are the methyl, ethyl, propyl, isopropyl, butyl, amyl, n-hexyl, octyl, caproyl, stearyl, cyclohexyl, benzyl, et cetera. Any ester or salt of an ester of the formula

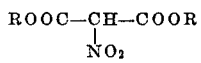

wherein R is a hydrocarbon radical, is used in the alkylation, and, as in the following illustrative examples, a particular nitromalonate is employed merely as a matter of convenience.

The "decarbalkoxylation" of the substituted nitromalonate involves treatment thereof with an agent capable of removing one of the -COOR groups of the nitromalonate, wherein R is the esterifying radical. Such treatment may advantageously be carried out by dissolving the substituted nitromalonate in an organic solvent, e. g., ether, and by adding an alkali metal, e. g., sodium, in alcohol in small portions to the solution. A salt usually forms and may be treated with dilute acid, e. g., five per cent HCl, filtered, washed, and the substituted nitroacetate extracted with a solvent. Other methods for decarbalkoxylation are also known, and will be found suitable. Basic substances, in general, are satisfactory.

The reduction of a selected nitromalonic or nitroacetic ester may also be conducted in any suitable and convenient manner. For example, in the preparation of tryptophane, we may place ethyl alpha-nitro-beta-(3-indole)-propionate, a small amount of organic solvent, such as absolute ethanol or butanol, and a quantity of Raney nickel catalyst in an autoclave under an original hydrogen pressure of 1500 p. s. i. at about 25 degrees centigrade and raise the temperature to about 100 degrees centigrade until the theoretical amount of hydrogen is absorbed. Other hydrogenation catalysts, such as Adam's catalyst, $PtO_2$, platinum, or palladium, may also be employed, and the apparatus and exact method of conducting the hydrogenation reaction is of concern only in that the nitro group of the nitro ester be reduced to the amino group by the procedure. Reduction of a substituted nitromalonate to an aminomalonate is conducted under the mildest conditions possible for attainment of the desired result, preferably at a lower temperature and minimum hydrogen pressure.

Likewise, if it is desired to conduct the reduction and hydrolysis steps in a single operation, this too may be done.

After the hydrogenation reaction, the catalyst may be removed by filtration, the remaining liquid concentrated under vacuum, treated with dilute sodium hydroxide solution, decolorized with activated charcoal, filtered, and adjusted to the desired pH with glacial acetic acid, whereafter the desired amino acid usually crystallizes from solution. Other conventional methods may be used to concentrate and crystallize the amino acid from the reaction product of the hydrogenation, and methods known in the prior art will be found satisfactory for this purpose. Upon further treatment with an additional amount of activated charcoal, filtration, and several recrystallizations, amino acid crystals of exceptional purity may in some instances be obtained. The reduction may also be carried out chemically with the employment of iron, iron filings, tin, zinc and concentrated hydrochloric acid, or with $(NH_4)_2S$, as well as other chemical reducing agents, or in any other manner to reduce the nitro group to the amino group in the substituted nitromalonate or nitroacetate, and to allow production of the desired alpha amino acid.

The alkylation reactions of a selected nitromalonate with the various reagents have already been outlined, but may be advantageously classified and further described as follows:

1. Alkylation of nitromalonic acid esters with:
   A. Alkyl halides, alkyl arylsulfonates, and alkyl sulfates with a basic catalysis.
   B. Carbinols and boron trifluoride catalysis.
   C. Substituted dialkylamines (tertiary amines), or quaternary ammonium compounds, with or without alkali and/or heat.
2. Condensation of nitromalonic acid esters with aldehydes or ketones using acidic, basic, or neutral catalysts according to Knoevnagel type.
3. Addition reactions of nitromalonic acid esters to:
   A. Activated double bonds.
   B. Epoxide or thioepoxide systems.

The method of our invention, in its broader sense, contemplates the preparation of all the naturally occurring and other primary alpha amino acids as indicated by the following illustrations, the acids produced, of course, being in each case the dl form:

Reactions of type 1 may be illustrated as follows:

I. For Benzyl-nitroacetic acid esters (RAD)=C₆H₅—CH₂—

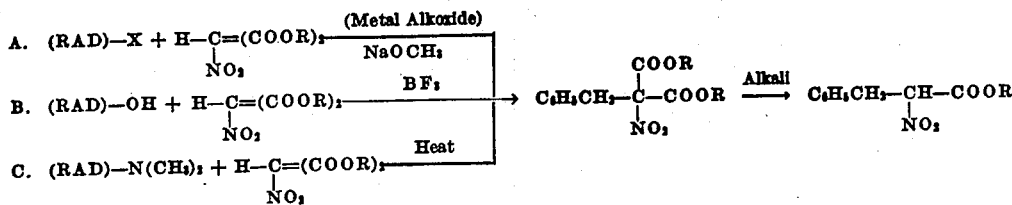

II. For Beta-(δ-imidazole)-alpha nitro propionic acid esters (RAD)=CH=CH—CH₂—
 $\quad\quad\quad\quad\quad\quad\quad\quad\quad\quad\quad\quad\quad\quad\quad\quad\quad\quad\quad\quad$ N   NH
 $\quad\quad\quad\quad\quad\quad\quad\quad\quad\quad\quad\quad\quad\quad\quad\quad\quad\quad\quad\quad\quad$ CH

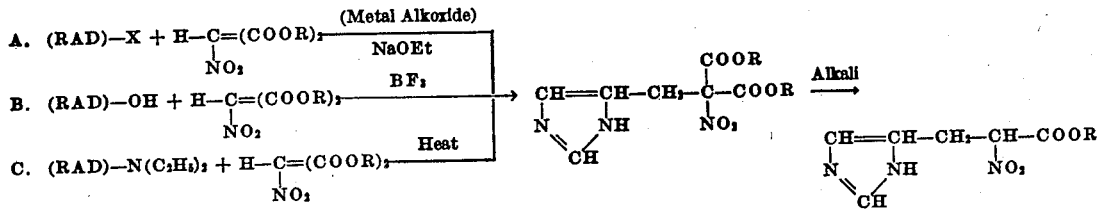

III. For alpha-nitro-isocaproic acid esters (RAD)=CH₃—CH—CH₂—
 $\quad\quad\quad\quad\quad\quad\quad\quad\quad\quad\quad\quad\quad\quad\quad\quad\quad\quad\quad\quad$ CH₃

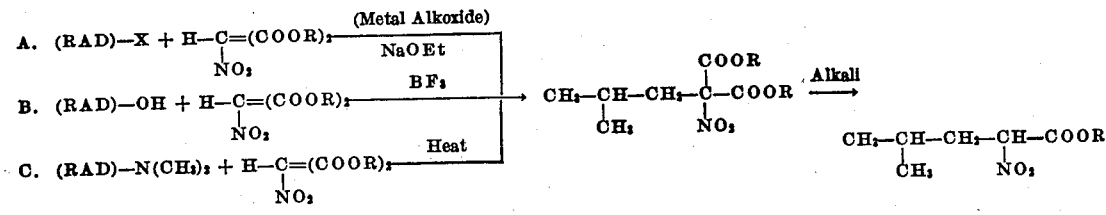

IV. For gamma-methylmercapto-alpha nitro-butyric acid esters (RAD)=(CH₃—S—CH₂—CH₂—)

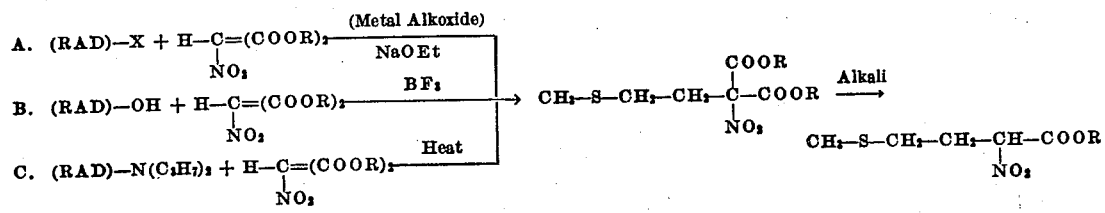

V. For Beta-(3 indole)-α-nitropropionic acid esters (RAD)=

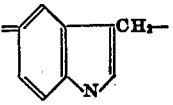

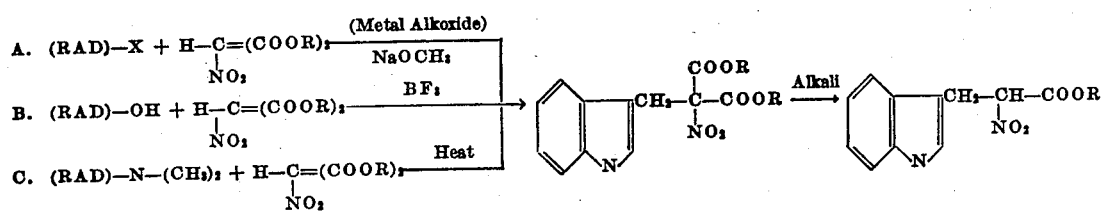

VI. For Beta-alkoxy-alpha-nitropropionic acid esters

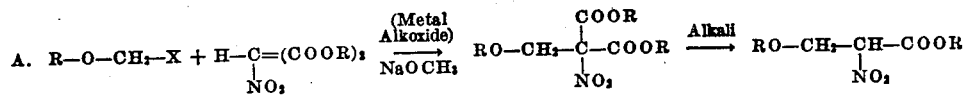

VII. Alpha-nitrosuccinic acid esters

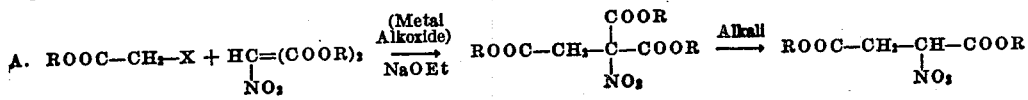

VIII. Alpha-nitrohexoic acid esters

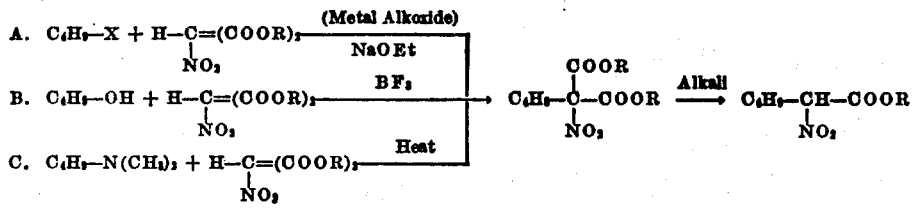

IX. Beta-p-methoxyphenol-alpha-nitropropionic acid esters

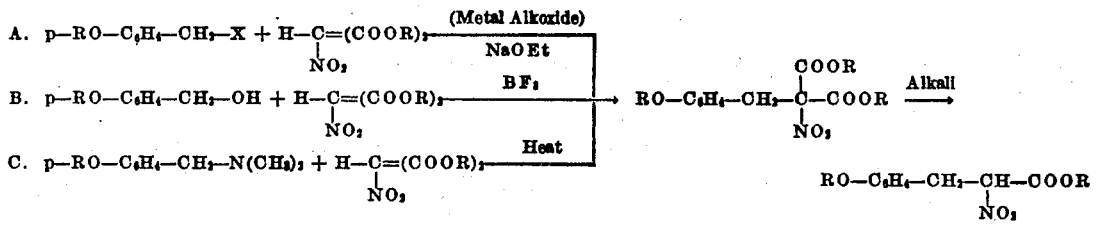

X. Beta-benzylmercapto-alpha-nitropropionic acid esters

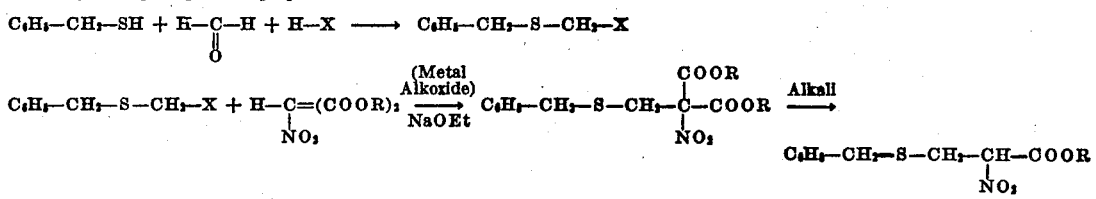

XI. For alpha-nitro-beta-methylvaleric acid esters

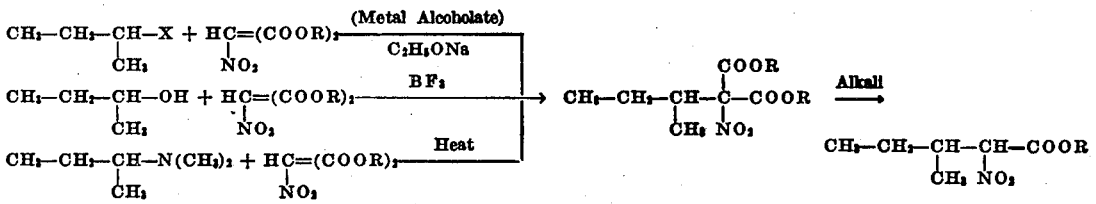

XII. For alpha-nitroisovaleric acid esters

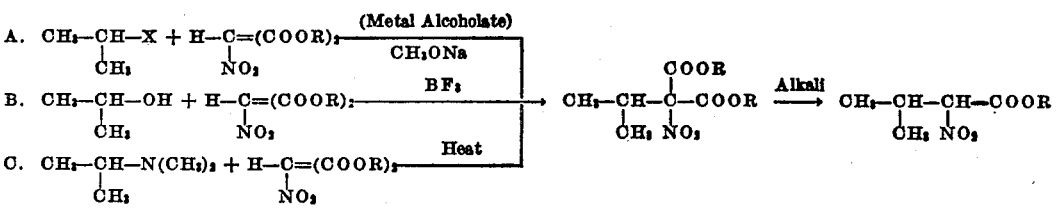

XIII. For alpha-nitrocaproic acid esters

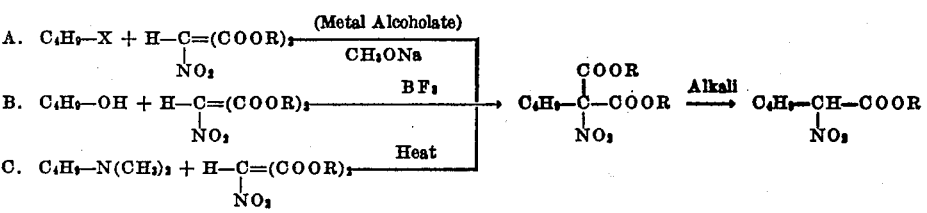

1. In the above illustrative examples of Type 1 alkylation, R indicates a hydrocarbon radical, preferably an alkyl radical, and X is employed to signify chlorine, bromine or iodine atoms. Alkyl arylsulfonic acid esters of the corresponding carbinols, of which para-toluene sulfonic acid esters are an example, may be employed instead of the halides as designated by (RAD-X) or by the complete formula. In type (A) alkylations, a basic catalyst may be employed, and metal alkoxides are used in an illustrative sense. The starting material in Type (C) alkylations is a substituted dialykylamine of the formula (RAD-N-R$_1$R$_2$)

wherein RAD is the polycarbon radical desired to be introduced into the nitroacetate molecule by the "alkylation" process and R$_1$ and R$_2$ are alkyl radicals.

Reactions of Type 2 may be illustrated as follows:

I. Alpha-nitro-beta-hydroxybutric acid esters

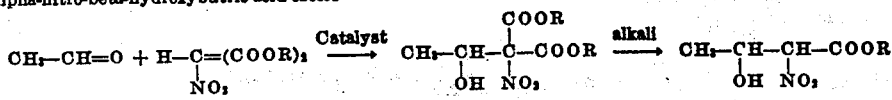

II. Alpha-nitro-beta-hydroxy-glutaric acid esters

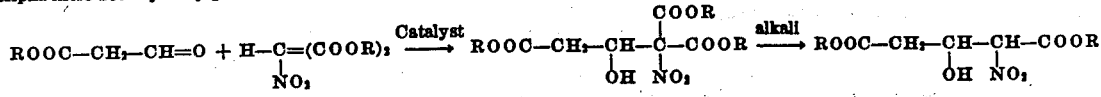

III. For alpha-nitro-beta-hydroxy-propionic acid esters

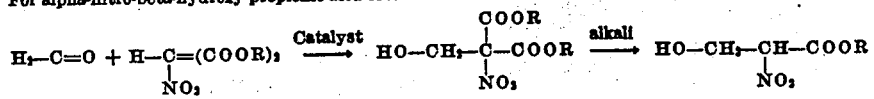

In the above illustrative examples of Type 2 Alkylation as applied in the preparation of several alpha nitro acids from an ester of nitromalonic acid, R indicates a hydrocarbon radical, preferably an alkyl radical. Catalysts employed for the condensation step may be acidic, neutral, or basic, and as representative catalysts are mentioned para-toluenesulfonic acid and piperidine, although numerous others may be employed with facility. The radical desired to be introduced into the nitromalonate molecule must, as will be noted, have either an aldehyde or ketone group present in the molecule in order to undergo the Knoevnagel type of condensation.

Reactions of Type 3 may be illustrated as follows:

I. 2-Nitro-4-cyanobutyric acid esters

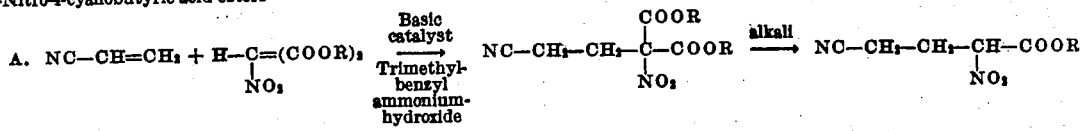

II. For 2-nitro-5-cyanovaleric acid esters

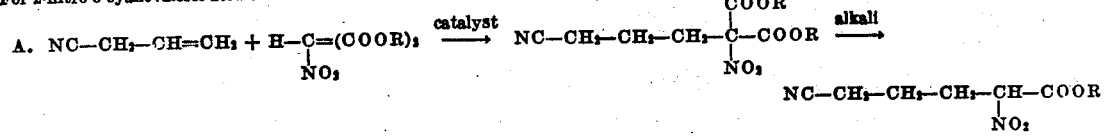

III. 1-Nitro-3-methylmercapto-propionic acid esters

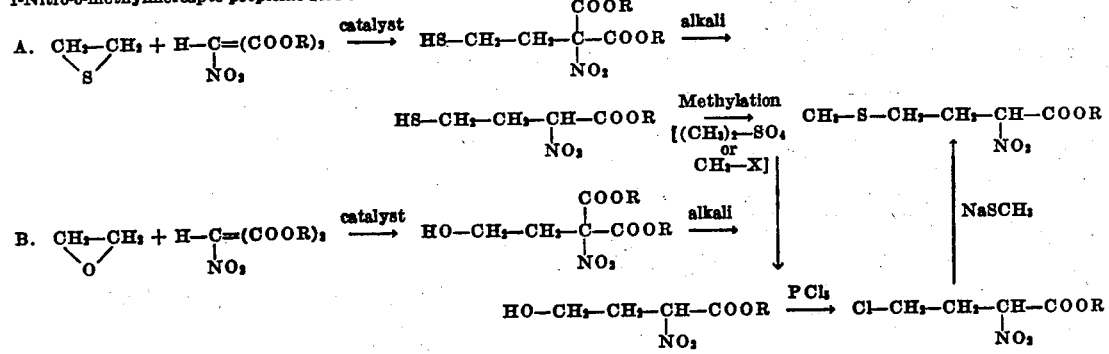

IV. Alpha-nitroglutaric acid esters

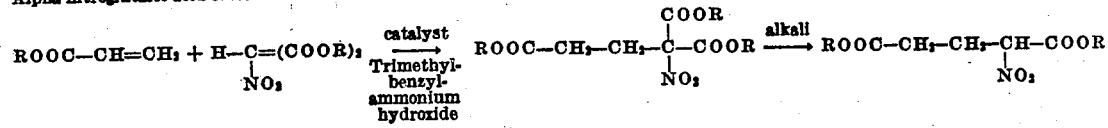

In the above illustrative examples of Type 3 Alkylation, R indicates a hydrocarbon radical, preferably an alkyl radical. Catalysts employed for the addition reaction may be a basic or other suitable addition catalyst, for example, a metal alkoxide or trimethylbenzyl-ammonium hydroxide. Methylation agents, if employed in the process, may be of any desirable type, e. g., methyl halides, dimethyl sulphate, or sodium methyl sulfide, depending upon the compound desired to be methylated, and the choice of methylating agents will be obvious to one skilled in the art. For this type of addition to occur, it will be noted that the compound to be introduced into the nitromalonate molecule must possess (1) an activated double bond, (2) an epoxide system, or (3) a thioepoxide system.

From the foregoing, it will be apparent that all of the naturally occurring alpha amino acids may be prepared by the method of the present invention. Still other alpha amino acids not naturally occurring may be prepared by the method of this invention by the introduction of the desired group into a nitromalonic ester followed by removal of one of the carbalkoxy groups or other treatment as indicated by the disclosure herein. Variations in preparing the amino acids which may be carried out after preparation of the substituted nitromalonate are as follows:

Variations in process after preparation of substituted nitromalonate:

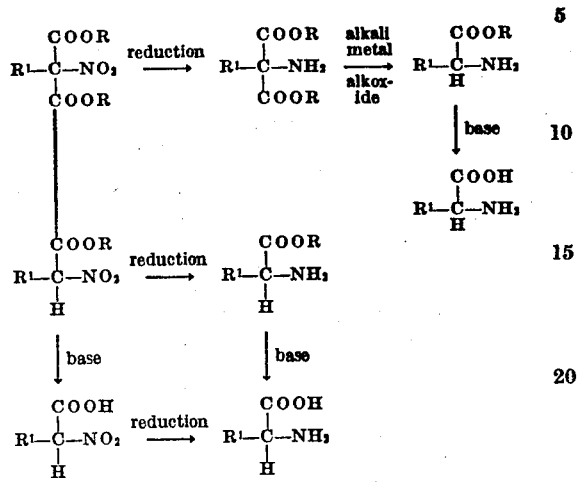

In the above sequence, R¹ indicates a substituting organic radical and R indicates a hydrocarbon radical.

It will be noted that, according to the method of the new synthesis, in each case, an ester of nitromalonic acid is first alkylated with a selected group to produce an ester of a substituted nitromalonic acid corresponding, (except for variable ether, thioether, ester and similar radicals which are later converted to the desired —OH, —SH, —COOH or other group) to the desired amino acid.

The nitromalonic acid ester and the nitroacetic acid ester intermediate of the amino acids are indicated schematically by the following:

I. Aliphatic, Monoamino, Monocarboxylic Acids
  a. Valine (alpha-amino-isovaleric acid)
   Intermediates:
    Isopropyl nitromalonic acid and esters thereof.
    Alpha-nitroisovaleric acid and esters thereof.
  b. Leucine (alpha-amino isocaproic acid)
   Intermediates:
    Isobutyl-nitromalonic acid and esters thereof.
    Alpha-nitroisocaproic acid and esters thereof.
  c. Isoleucine (alpha-amino-beta-methylvaleric acid)
   Intermediates:
    Sec.-butyl nitromalonic acid and esters thereof.
    Alpha-nitro-beta-methylvaleric acid and esters thereof.
  d. Serine (alpha-amino-beta-hydroxypropionic acid)
   Intermediates:
    Hydroxymethylnitromalonic acid and esters thereof.
    Alkoxymethyl nitromalonic acid and esters thereof.
    Alpha-nitro-beta-hydroxypropionic acid and esters thereof.
    Alpha-nitro-beta-alkoxy-propionic acid and esters thereof.
  e. Cysteine (Alpha-amino-beta-thiolpropionic acid)
   Intermediates:
    Mercaptomethyl-nitromalonic acid and esters thereof.
    Hydrocarbonmercaptomethyl nitromalonic acid and esters thereof.
    Alpha-nitro-beta-mercapto-propionic acid and esters thereof.
    Alpha - nitro - beta - hydrocarbonmercaptopropionic acid and esters thereof.
  f. Threonine (alpha-amino-beta-hydroxy-n-butyric acid)
   Intermediates:
    Beta - hydroxyethyl - nitromalonic acid and esters thereof.
    Beta-alkoxyethyl-nitromalonic acid and esters thereof.
    Alpha-nitro-beta-hydroxy-butyric acid and esters thereof.
    Alpha-nitro-beta-alkoxy-butyric acid and esters thereof.
  g. Methionine (alpha-amino-gamma-methylmercapto-butyric acid)
   Intermediates:
    Methyl-mercaptoethyl-nitromalonic acid and esters thereof.
    Alpha - nitro - gamma - methylmercaptobutyric acid and esters thereof.
  h. Norleucine (alpha-amino-caproic acid)
   Intermediates:
    n-Butyl-nitromalonic acid and esters thereof.
    Alpha-nitro-caproic acid and esters thereof.

II. Monoamino Dicarboxylic Acids
  a. Aspartic acid (aminosuccinic acid)
   Intermediates:
    Carbalkoxymethyl-nitromalonic acid and esters thereof.
    Nitrosuccinic acid and esters thereof.
  b. Glutamic acid (alpha-amino-glutaric acid)
   Intermediates:
    Beta-carbalkoxyethyl nitromalonic acid and esters thereof.
    Alpha-nitroglutaric acid and esters thereof.
  c. Hydroxyglutamic acid (alpha-amino-beta-hydroxy-glutaric acid)
   Intermediates:
    Beta-(1-hydroxy-2-carbalkoxy-)ethyl-nitromalonic acid and esters thereof.
    Beta - (1-alkoxy-2-carbalkoxy-)ethyl-nitromalonic acid and esters thereof.
    Alpha-nitro-beta-hydoxyglutaric acid and esters thereof.
    Alpha-nitro-beta-alkoxyglutaric acid and esters thereof.

III. Aromatic Amino Acids
  a. Phenylalanine (alpha - amino-beta-phenylpropionic acid)
   Intermediates:
    Benzyl-nitromalonic acid and esters thereof.
    Alpha-nitro-beta-phenylpropionic acid and esters thereof.
  b. Tyrosine (alpha-amino-beta-p-hydroxyphenyl-propionic acid)
   Intermediates:
    p-Hydroxybenzyl-nitromalonic acid and esters thereof.
    p-Alkoxybenzyl-nitromalonic acid and esters thereof.
    Alpha-nitro - beta-p-hydroxy-phenylpropionic acid and esters thereof.
    Alpha-nitro - beta - p-alkoxy-phenylpropionic acid and esters thereof.

IV. Heterocyclic Amino Acids
  a. Tryptophane (alpha-amino-beta-(3-indole) propionic acid)
   Intermediates:
    (3-indole)methyl-nitromalonic acid and esters thereof.

Alpha-nitro-beta-(3-indole)propionic acid and esters thereof.
b. Histidine (alpha-amino-beta-(5-imidazole)-propionic acid)
  Intermediates:
    (5-Imidazole)-methyl-nitromalonic acid and esters thereof.
    Alpha-nitro-beta-(5-imidazole)propionic acid and esters thereof.
V. Diamino Monocarboxylic Acids
  a. Arginine (alpha amino-delta-guanidine-valeric acid)
  Intermediates:
    Beta-cyanoethyl-nitromalonic acid and esters thereof.
    Alpha-nitro-gamma-cyanobutyric acid and esters thereof.
  b. Lysine (alpha, epsilon-diaminocaproic acid)
  Intermediates:
    Beta-(3-cyanopropyl)nitromalonic acid and esters thereof.
    Alpha-nitro-delta-cyanovaleric acid and esters thereof.

Many of the esters of nitromalonic acid are entirely new compositions of matter, having been synthesized first by the method of the present invention. It is therefore an object of the invention to provide these new and useful esters of substituted nitromalonic acids and nitroacetic acids which have utility as intermediates in the preparation of amino acids.

The following detailed examples illustrate further the manner in which the principle of this invention may be applied, but are not to be construed as limiting.

*Example I.—Alkylation of an Ester of Nitromalonic Acid*

Ethyl nitromalonate (0.1 mole, 20.5 grams) (prepared according to Arndt and Rose, J. Chem. Soc. 1935, 1–10) gramine (0.1 mole, 17.3 grams) and 100 milliliters of dry xylene were placed in a 250 milliliter three-neck flask fitted with a stirrer, nitrogen inlet, thermometer, and reflux condenser which was surmounted by a soda-lime drying tube. The drying tube was connected to a wash bottle containing standard acid to determine the amount of dimethylamine evolved. When the nitromalonate and gramine were mixed, a reaction occurred with the evolution of some heat, probably the formation of a salt. A moderate stream of nitrogen was passed through the mixture which was heated, with stirring, until a vigorous evolution of dimethylamine began at a temperature of about 100 degrees centigrade. The solution was then heated at 110 to 115 degrees centigrade for 5 hours, whereupon the evolution of dimethylamine became negligible. A total of 69.4 per cent of the theoretical amount of dimethylamine was collected. The warm xylene solution was treated with 1 gram of decolorizing charcoal and filtered. The clear red filtrate was cooled to room temperature and extracted twice with 50-milliliter portions of 10 per cent hydrochloric acid. Upon neutralization of the combined hydrochloric acid layers, an insignificant amount of gramine was recovered. The xylene layer was washed once with water and twice with 50-milliliter portions of 10 per cent sodium carbonate. The xylene solution, containing the neutral material, was dried over magnesium sulfate and concentrated in vacuum. The yield of crude product was 30.1 grams, or 90 per cent of theory. The ethyl-alpha-nitro-alpha-carbethoxy-beta-(3-indole)-propionate, $N_D^{20}=1.5455$, analyzed for C, H, and N as follows:

|  | C | H | N |
|---|---|---|---|
| Calculated | 57.48 | 5.43 | 8.38 |
| Found | 57.29 | 5.14 | 8.45 |
|  | 57.19 | 5.14 | 8.23 |

*Example II.—Decarboxylation of an Alkyl-Nitromalonic Acid Ester*

Diethyl alpha-nitro-alpha-carbethoxy-beta-(3-indole)-propionate (3.34 grams, 0.01 mole) was dissolved in 15 milliliters of ether. To this solution was added in small portions over a period of about 45 minutes 0.23 grams (0.01 mole) of sodium dissolved in 20 milliliters of absolute ethanol. A salt formed almost immediately after the first addition, and the precipitate increased during the first two hours. After standing overnight at room temperature, the precipitate was filtered off and washed with ether. The nearly white salt was treated with an excess of 5 per cent hydrochloric acid, and the free ethyl alpha-nitro-beta-(3-indole)-propionate was extracted into ether. The ether solution was washed with water and dried over magnesium sulfate. After concentration in vacuum, the residual oil crystallized spontaneously. A sample, recrystallized once from 95 per cent alcohol, melted at 64.8–66 degrees centigrade (uncorrected). A mixed melting point with authentic ethyl alpha-nitro-beta-(3-indole)-propionate melted at 64.0 degrees centigrade to 66 degrees centigrade.

Representative esters of alpha-nitro-beta-(3-indole)-propionic acid which may be prepared by "decarbalkoxylation" of the corresponding substituted nitromalonate as indicated in the foregoing, and physical constants thereof, are as follows:

[Isopropyl alpha-nitro-beta-(3-indole) propionate.]

|  |  | C | H | N |
|---|---|---|---|---|
| $N_D^{19}=1.541$ | Theory | 60.85 | 5.83 | 10.12 |
|  | Found | 60.83 | 5.93 | 9.40 |
|  |  | 61.27 | 6.27 | 9.14 |

[n-Hexyl alpha-nitro-beta-(3-indole) propionate.]

|  |  | C | H | N |
|---|---|---|---|---|
| $N_D=1.5359$ | Theory | 64.13 | 6.97 | 8.80 |
|  | Found | 64.02 | 6.96 | 9.11 |
|  |  | 63.69 | 6.97 | 9.00 |

[Cyclohexyl alpha-nitro-beta-(3-indole) propionate.]

|  |  | C | H | N |
|---|---|---|---|---|
| $N_D=1.5558$ | Theory | 64.54 | 6.37 | 8.86 |
|  | Found | 64.45 | 6.49 | 9.38 |
|  |  | 64.55 | 6.62 | 9.18 |

[Benzyl alpha-nitro-beta-(3-indole) propionate.]

|  |  | C | H | N |
|---|---|---|---|---|
| $N_D^{21}=1.592$ | Theory | 66.65 | 4.97 | 8.64 |
|  | Found | 66.48 | 5.07 | 9.02 |
|  |  | 66.42 | 5.33 | 8.87 |

The latter ester, an oil, crystallized completely upon standing, after which the solid melted at 61.5–62.5 degrees centigrade (uncorr.).

Example III.—Reduction of alpha-Nitro-beta-(3-Indole)propionic Acid Esters

The ester (0.01 mole) was dissolved in about 15 milliliters of absolute alcohol and placed in a bomb of 40 milliliters void with about one gram of Raney nickel catalyst. Hydrogen was introduced into the bomb up to a pressure of about 2500 psi, the temperature being raised to 100 degrees centigrade as rapidly as possible with constant rocking of the autoclave. Reduction usually occurred in about 1.5 to 2 hours, after which the bomb was allowed to cool to room temperature, and the catalyst removed by filtration and washed with alcohol. Alcohol was removed by concentration, the crude ester hydrolyzed by refluxing for 2 to 4 hours with 15 milliliters of 10 per cent aqueous sodium hydroxide, treated with 250 milligrams of charcoal, filtered, and the solution brought to a pH of about 5.95 with glacial acetic acid. After removal of a small amount of dark brown amorphous material which usually precipitated immediately, the tryptophane came out upon standing overnight in the cold. The tryptophane was then filtered, washed with a little cold water, alcohol, and finally with ether. The product at this point usually had a grayish white apearance and was recrystallized from 33 per cent alcohol according to usual procedure. Melting points and mixed melting points with an authentic sample proved that the product from each of the esters was dl-tryptophane.

| Starting Ester | dl-Tryptophane [1] | |
|---|---|---|
| | M. P., °C. | M. M. P., °C. |
| Methyl | 284 | 285 |
| Isopropyl | 292 | 291 |
| n-Hexyl | 278.5 | 278 |
| Cyclohexyl | 275 | 276 |
| Benzyl | 272 | 271 |

[1] Uncorrected, decomposition. Melting point and mixed melting point taken together.

Example IV.—Preparation of Tryptophane

Ethyl alpha-nitro-beta (3-indole)-propionate (2.62 grams), 15 milliliters of absolute ethanol, and about one-half gram of Raney nickel catalyst were placed in a bomb of 40 milliliters capacity. The reduction was carried out at 100 degrees centigrade and with an original hydrogen pressure of 1500 psi at 25 degrees centigrade. The theoretical amount of hydrogen was absorbed during a 12 hour period. After filtering off catalyst, the alcohol was removed by concentration under vacuum. The light colored oil which remained was heated under reflux with 16 milliliters of 10 per cent aqueous sodium hydroxide for two hours. After treating with activated charcoal, and filtering, the pH of the solution was adjusted to 5.9 with glacial acetic acid. Crystals appeared and the flask was cooled for a period of 15 hours, whereafter tryptophane was filtered off and washed with a small quantity of cold water. The wet cake was dissolved in 100 milliliters of 33 per cent alcohol, treated with an additional quantity of charcoal, filtered hot, and allowed to cool slowly with rubbing. The tryptophane crystalized out in glistening plates, was filtered and washed with alcohol and with ether. The crystals were then dried in a vacuum.

An analytical sample was prepared by recrystallizing four times from 33 per cent alcohol. The sample melted at 278.0 to 280.0 degrees centigrade and analyzed as follows:

| | C | H |
|---|---|---|
| Theory | 64.69 | 5.92 |
| Found | 64.50 | 6.06 |
| | 64.65 | 5.92 |

The mixed melting point with an authentic dl-tryptophane was 278.0–280.0 degrees centigrade (uncorrected) (decomposed).

Example V.—Preparation of Tryptophane

Reduction can also be carried out chemically as follows: Ethyl alpha-nitro-beta-(3-indole)propionate (2.62 grams), 3.5 grams of powdered iron (or iron filings), 7.5 milliliters of water, 7.5 milliliters of alcohol, and 10 milliliters of concentrated hydrochloric acid were placed in a 250 milliliter flask, stirred vigorously for 15 minutes and then heated, with stirring, to boiling over a period of about 15 minutes. The reaction mixture was refluxed for 15 minutes, cooled to room temperature, made alkaline with 10 per cent aqueous sodium hydroxide, filtered, and washed with water. The clear alkaline solution was brought to a pH of 6.0 with concentrated sulfuric acid. After seeding and rubbing, crystallization began. When crystallization was complete, the product was filtered and recrystallized from 33 per cent alcohol, whereafter the dl-tryptophane melted at 283–4 degrees centigrade (uncorrected) (decomposed). A mixed melting point with an authentic dl-tryptophane was 283–283.5 degrees centigrade (decomposed).

Inasmuch as various modifications may be made in the present invention without departing from the spirit or scope thereof, it is to be understood that we limit ourselves only as defined by the appended claims.

We claim:

1. The process which includes: alkylating an ester of nitromalonic acid, containing up to and including 8 carbon atoms in the esterifying groups, with an alkylating agent to produce a substituted nitromalonate, and reducing and hydrolyzing the substituted nitromalonate to an alpha amino acid.

2. The process which includes: mixing together, at a reaction temperature, an ester of nitromalonic acid, containing up to and including 8 carbon atoms in the esterifying groups, and an alkylating agent to produce a substituted nitromalonate, decarbalkoxylating the substituted nitromalonate to a substituted nitroacetate with a basic material, reducing the substituted nitroacetate to a substituted aminoacetate, and hydrolysing the substituted aminoacetate to an amino acid.

3. The process of claim 2, wherein the alkylation is accomplished by heating a tertiary amine together with a nitromalonic ester.

4. The process which includes: decarbalkoxylating a substituted dialkyl nitromalonate to a substituted alkyl nitromalonate, and reducing the nitro group of the product to an amino group at a temperature below about 100 degrees centigrade.

5. The process which includes: decarbalkoxylating a substituted dialkyl nitromalonate to a substituted nitroacetate, and reducing and hydrolyzing the nitroacetate to an amino acid.

6. The method which includes: alkylating an ester of nitromalonic acid, containing up to and including 8 carbon atoms in the esterifying groups, with a beta-methylindoleating agent to introduce a beta-methylindole group into the acid portion of the nitromalonic acid ester at the alpha carbon atom and produce a diester of alpha-nitro - alpha - carboxy-beta-(3-indole)-propionic acid.

7. The method which includes: alkylating an ester of nitromalonic acid, containing up to and including 8 carbon atoms in the esterifying groups, with a 3-dialkylaminomethylindole.

8. The method which includes: alkylating an ester of nitromalonic acid, containing up to and including 8 carbon atoms in the esterifying groups, with 3-dimethylaminomethylindole.

9. The method of claim 8, wherein the temperature is maintained below about 115 degrees centigrade.

10. The process which includes: mixing a tertiary dialkylamine with a dialkyl ester of nitromalonic acid at a temperature between about room temperature and about 115 degrees centigrade, decarbalkoxylating the substituted nitromalonic thus produced, reducing the substituted nitroacetate to a substituted aminoacetate, and hydrolyzing the substituted aminoacetate to an alpha amino acid.

11. The process of claim 10, wherein the dialkylamine is a 3-dialkylaminomethylindole.

12. The process of claim 10, wherein the dialkylamine is gramine.

13. The process which includes: mixing a 3-dialkylaminomethylindole with a dialkyl ester of nitromalonic acid at a temperature between about room temperature and about 115 degrees centigrade, and separating a substituted nitromalonate from the reaction product.

14. The process of claim 13, wherein the dialkylamine is gramine and the substituted nitromalonate separated is an alpha-nitro-alpha-carbalkoxy-beta-(3-indole)-propionate.

15. The process which includes: mixing together an alkylating agent and a dialkyl ester of nitromalonic acid at a reaction temperature to produce a substituted nitromalonate, decarbalkoxylating the substituted nitromalonate to a substituted nitroacetate with an alkali metal alkoxide, reducing the substituted nitroacetate thus produced at a temperature below about 100 degrees centigrade to a substituted aminoacetate, and, hydrolyzing the product to an alpha amino acid.

16. The process of claim 15, wherein the alkylation is with a dialkylamine at a temperature below about 115 degrees centigrade.

17. An alkyl alpha-nitro-alpha-carbalkoxy-beta-(3-indole)-propionate.

18. Ethyl alpha-nitro-alpha-carbethoxy-beta-(3-indole)-propionate.

19. The method which includes: alkylating an ester of nitromalonic acid containing up to and including 8 carbon atoms in the esterifying groups, with a beta-methylindoleating agent to produce a diester of alpha-nitro-alpha-carboxy-beta(3-indole)-propionic acid, decarbalkoxylating the diester to an ester of alpha-nitro-beta-(3-indole)-propionic acid.

20. The method which includes: alkylating a dialkyl ester of nitromalonic acid with a 3-dialkylaminomethylindole, and decarbalkoxylating the alkyl alpha-nitro-alpha-carbalkoxy-beta-(3-indole)-propionate thus produced to an ester of alpha-nitro-beta-(3-indole)-propionic acid.

DAVID I. WEISBLAT.
DOUGLAS A. LYTTLE.

REFERENCES CITED

The following references are of record in the file of this patent:

Beilstein—4th edition—Vol. 2 (1920), pages 596 and 597, citing: Ulpiani in R. A. L. (5)—12-I-441.

Degering—"An Outline of Organic Chemistry"—Barnes and Noble, Inc.—N. Y.—4th ed. (1941), page 229.

Snyder et al.—J. Am. Chem. Soc.—Vol. 66 (Feb. 1944), pages 200 to 204.

Albertson et al.—J. Am. Chem. Soc.—Vol. 66 (Mar. 1944), page 500.

Snyder et al.—J. Am. Chem. Soc.—Vol. 66 (Mar. 1944), pages 350 and 351.